United States Patent [19]

Tani et al.

[11] Patent Number: 4,644,201
[45] Date of Patent: Feb. 17, 1987

[54] ARMATURE FOR DIRECT CURRENT MOTOR WITH IMBALANCE CORRECTION

[75] Inventors: Tatsuhiro Tani; Hiroyuki Nagasawa; Tosio Tomite; Kiyomasa Tsubota, all of Katsuta; Akira Takahashi, Toukai, all of Japan

[73] Assignee: Hitachi, Ltd., Tokyo, Japan

[21] Appl. No.: 754,926

[22] Filed: Jul. 15, 1985

[30] Foreign Application Priority Data

Jul. 13, 1984 [JP] Japan .................. 59-146545

[51] Int. Cl.$^4$ ........................................... F16F 15/22
[52] U.S. Cl. ................... 310/51; 74/573 R; 310/261
[58] Field of Search ............... 74/573 R; 310/51, 261, 310/262; 360/133

[56] References Cited

U.S. PATENT DOCUMENTS

| | | | |
|---|---|---|---|
| 861,463 | 7/1907 | Hyde | 74/573 |
| 2,336,697 | 12/1943 | Moeller | 74/573 |
| 3,342,083 | 9/1967 | Kaliszer et al. | 74/573 |
| 3,838,464 | 9/1974 | Doyle | 74/573 |
| 4,535,373 | 8/1985 | Schuh | 360/133 |

Primary Examiner—Patrick R. Salce
Assistant Examiner—D. L. Rebsch
Attorney, Agent, or Firm—Antonelli, Terry & Wands

[57] ABSTRACT

Two or more imbalance correcting openings with the same cross-sectional configuration are provided in an armature core in parallel to a shaft in such a manner as to be equally spaced on a circumference which is concentric with the shaft, and weights are inserted in the adjacent openings to thereby correct any imbalance, the number of adjacent openings being selected to be $(N-1)/2+1$ or less when the number n of openings is odd and to be $n/2$ or less when the number n is even.

24 Claims, 8 Drawing Figures

ARMATURE FOR DIRECT CURRENT MOTOR WITH IMBALANCE CORRECTION

FIELD OF THE INVENTION

The present invention relates to an armature for a DC motor. More particularly, the invention pertains to an armature for a DC motor having a structure which is suitable for correcting imbalance, which constitues a main cause of vibrations.

BACKGROUND OF THE INVENTION

There have heretofore been two methods, that is, the addition method and the removal method, for correcting the imbalance of an armature of an electric motor, as discussed in a publication titled "Method of Balancing Small-Sized Motor Rotor" by Shigesawa, Kawamori and Nakayama, on pp. 173 to 177 in Shimazu Hyoron Vol. 32, No. 2 (1975). In correction by the addition method, material such as is resin is added to the outer pheripheral portion of the armature. However, it is difficult to make adjustment by adding a minute amount of the resin. On the other hand, in correction by the removal method, it is possible to effect a minute adjustment relatively easily. However, when the outer periphery of the armature core is partially eliminated, the air gap defined between the same and the field system is theoretically changed. In consequence, in a permanent magnet type DC motor in particular, the second method of correction definitely involves the disadvantge that a magnetic vibration is easily generated.

SUMMARY OF THE INVENTION

An object of the present invention is to provide an armature for a DC motor which enables easy and highly accurate imbalance correction, is well balanced and further has excellent vibrational characteristics.

A first feature of the present invention resides in an arrangement wherein two or more imbalance correcting openings are provided in an armature core in parallel to a shaft on a circumference which is concentric with the shaft, and members serving as weights are inserted in the adjacent openings to thereby correct any imbalance, the number of adjacent openings being selected to be $(n-1)/2+1$ or less where the number n of openings is odd and to be $n/2$ or less when the number is even. A second feature of the present invention resides in that at least a part of each of the members inserted in the adjacent openings is eliminated or trimmed, to correct any imbalance in the condition in which the number of adjacent openings is selected in the manner mentioned in the first feature of the present invention.

According to the imbalance correction of the present invention, the object of the present invention is easily achieved, because the imbalance correction of an armature for D.C. motor can be practiced only by inserting members into the correcting openings, and weight of the inserting members is easily adjustable by lengthening or shortening at least one of the inserting members.

DETAILED DESCRIPTION OF THE PREFERRED EMBODIMENTS

Figure 1:
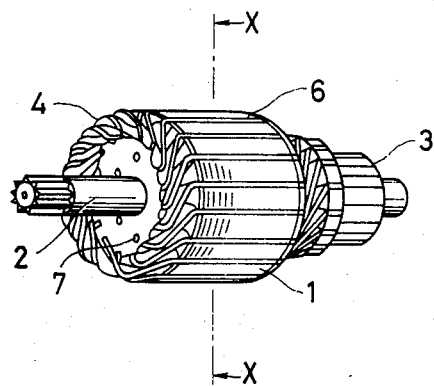
FIG. 1 is a perspective view of one embodiment of the armature for a DC motor according to the present invention.
Figure 2:
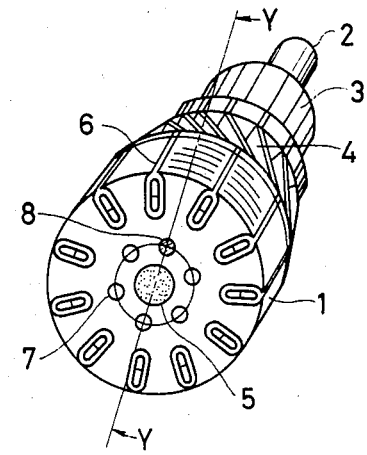
FIG. 2 is a sectional perspective view taken along the lline X—X of FIG. 1, FIGS. 3 and 4 are two embodiments of sectional views of an armature core taken along the line Y—Y of FIG. 1, FIGS. 5 and 7 are views illustrating methods of correcting imbalance employed in the case in which the number of openings is even and odd, respectively.
Figure 5:
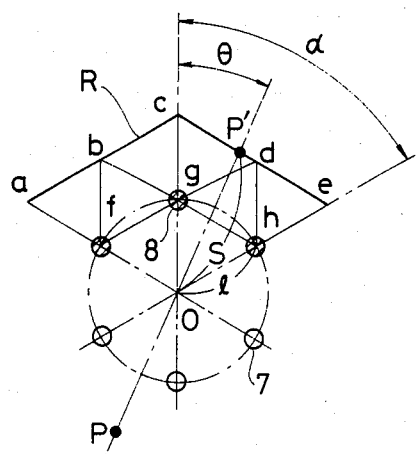
Figure 6:
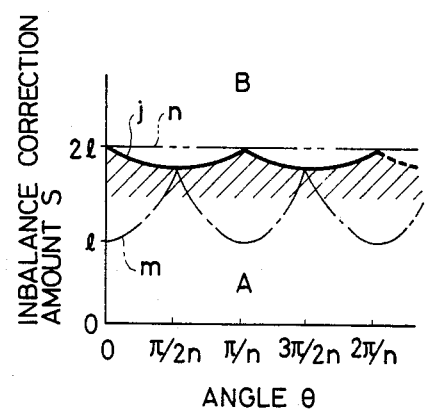
FIGS. 6 and 8 are views illustrating imbalance correctable regions by the methods shown in FIGS. 5 and 7, respectively.
Figure 7:
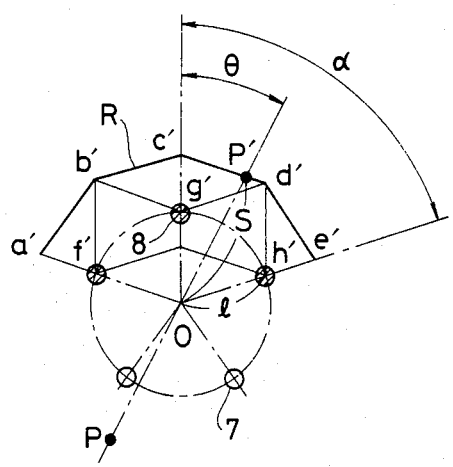

Referring to FIGS. 1 and 2 the reference numeral 1 denotes an armature core; 2 a shaft; 3 a commutator; 4 a coil; and 5 a shaft press-fitting bore formed in the armature core 1. Two or more openings 7 with the same cross-sectional configuration are provided between coil-inserting slots 6 and the shaft press-fitting bore 5 in the armature core 1, in parallel to the shaft 2 in such a manner as to be equally spaced on a circumference which is concentric with the shaft 2. In FIGS. 7 and 5, 5 and 6 openings with the same cross-sectional configuration are provided. The openings 7 are employed to correct imbalance of the armature. It is possible for the openings 7 to be easily machined at the same time as when the armature core 1 is blanked by a press, before the shaft 2 is press-fitted into the armature core 1.

Figure 3:
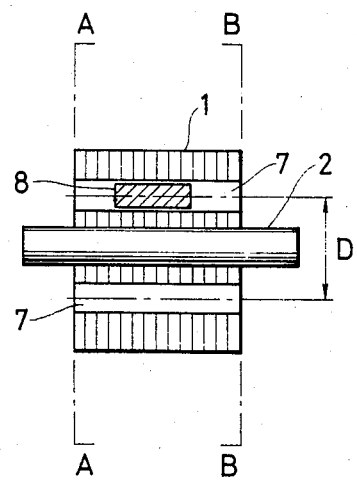
Figure 4:
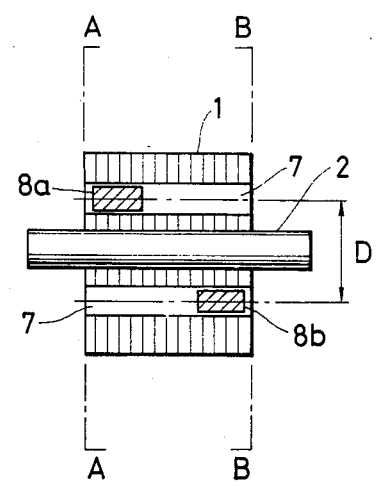

Referring to FIGS. 3 and 4, the openings 7 provided as above are filled with, for example, a metal material 8 to correct imbalance of the armature. FIG. 3 shows how imbalance is corrected when the points of imbalance are concentrated on the center of the armature core 1 between A and B which are side plane surfaces thereof. In this case, the metal material 8 is inserted in the central portion of the opening 7 as illustrated. On the other hand, FIG. 4 shows the way in which imbalance is corrected when the points of imbalance are concentrated on both the A and B sides of the armature core 1. In FIG. 4, a metal material 8a and a metal material 8b are respectively inserted on the A side of one opening and the B side of another 7 in the manner that the composite weight center of the materials 8a, 8b is arranged to be on the same plane containing each weight center of the materials 8a, 8b. It is apparent that in both case imbalance correction can be easily effected by varying the weight of the metal material 8 or the like in accordance with the amount of imbalance.

However, the amount of the metal material 8 or the like which can be inserted in each opening 7 is restricted by the configuration of the opening 7. For this reason, the imbalance correction amount in the case when only one portion of each opening 7 is utilized is smaller than a value obtained by dividing the product of the weight of the metal material 8 and the distance $D/2$ between the central position of the metal material 8 and the center of the shaft 2 by the distance L between the central position of imbalance and the center of the shaft 2. It is to be noted that since the cross-sectional area of each opening 7 is restricted by the configuration, the magnetic properties and mechanical strength of the armature core 1 cannot be sharply increased. Accordingly, among the openings 7, a plurality of openings 7 which permit vector combination are filled with the metal material 8 or the like to thereby correct imbalance, whereby a large degree of imbalance may be corrected.

Incidentally, when the number n of openings 7 is odd, the maximum value N of the number of openings 7 which permit vector combination is as follows:

$$N = \frac{n-1}{2} + 1 \tag{1}$$

On the other hand, when the number n is even, the number N is as follows:

$$N = \frac{n}{2} \tag{2}$$

FIG. 5 is a view illustrating a method of correcting imbalance when the number of openings is even, while FIG. 6 is a graph illustrating an imbalance correctable region, which exemplarily shows the case where n=6. In FIG. 5, when points of imbalance are concentrated on a point P, among the openings 7, those which are respectively located at points f, g and h are filled with a proper amount of the metal material 8 which is decided by the following formula (3) or (4), so that it is possible for vectors to be combined at a point P' as a force couple, whereby it is possible to correct both the imbalance amount and the imbalance position (the angle $\theta$) with high accuracy. The maximum range of imbalance correctable in this case is represented by the maximum imbalance correction curve n shown in FIG. 6. The region B on the upper side of the curve n is an imbalance non-correctable region in which imbalance can not be corrected by the metal material 8 or the like. The region A on the lower side of the curve n is an imbalance correctable region in which imbalance can be corrected by the metal material 8 or the like. The curve m shows the imbalance correction curve in which two correcting metal materials are inserted to two openings. The curve j shows an imbalance correcting curve in which the weight inserted to one opening is 1 gr, and is represented by the following formula.

$$S = \frac{2Ml \cos\left(\frac{\alpha}{2}\right)}{\cos\left(\frac{\alpha}{2} - \theta\right)} \tag{3}$$

where
S: the imbalance correction amount (gr)
M: weight of one inserting material (gr)
l: the distance between the center of the shaft 2 and the center of the opening 7.
R shows the maximum imbalance correcting line.

Figure 8:
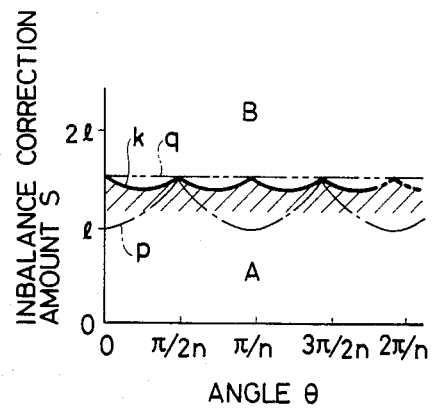

FIG. 7 is a view illustrating a method of correcting imbalance in the case where the number of openings is odd, while FIG. 8 is a graph illustrating an imbalance correctable region, which exemplarily shows the case where n=5. In a manner similar to the above, when points of imbalance are concentrated on the point P, among the openings 7, those which are respectively located at points f', g' and h' are filled with a proper amount of the metal material 8 or the like so that it is possible for vectors to be combined at the point P' as a force coupled, thus enabling correction of the imbalance. The maximum range of imbalance correctable in this case is represented by the maximum imbalance correction curve q shown in FIG. 8. The curve p shows the imbalance correction curve in which two correcting metal materials are inserted into two openings. The curve k shows an imbalance correcting curve in which the weight inserted to one opening is 1 gr, and is represented by the following formula:

$$S = \frac{Ml(1 + 2\cos\alpha) \cdot \cos\frac{\alpha}{4}}{\cos\left(\theta - \frac{\alpha}{4}\right)} \tag{4}$$

According to the above-described embodiment of the present invention, the openings 7 provided in the armature core 1 are filled with the metal material 8 or the like to thereby correct imbalance. Therefore, the correction is easily effected, and it is possible to make imbalance correction with high accuracy. One-side balancing shown in FIG. 3 and two-side balancing shown in FIG. 4 are both possible. Further, in the conventional method wherein the armature core is partially eliminated, the elimination amount is restricted by the configuration thereof and, therefore, it is not possible to sufficiently correct imbalance of an armature which has a large amount of imbalance. Moreover, on some occasions, noise may be disadvantageously generated when the motor is rotated. In addition, in the case of a DC motor which employs a permanent magnet as a field system, the range of application of which has been enlarged these days, if the armature core 1 is sharply cut off, the air gap between the same and the field system is made nonuniform, which fact involves a risk of generating a magnetic vibration. According to the embodiment of the present invention, imbalance is corrected by making use of the openings 7 which are provided between the slot seat and the shaft press-fitting bore 5 of the armature core 1. Therefore, there is no effect on the magnetic properties. Moreover, by increasing the cross-sectional area of each of the openings 7, it is possible to increase the imbalance correctable amount and to make imbalance correction without damaging the outer peripheral portion of the armature core 1. Further, according to the conventional method wherein a resin or the like is added to the outer peripheral portion of the armature, it is common to attach the resin on the coil 4 between the armature 1 and the commutator 3. It is, however, difficult to attach an amount of resin which corresponds to an amount of imbalance and to make uniform the distance between the centroid position of the resin attached and the axis of the armature, without any variation. In general, therefore, it is common to first effect a rough correction as a primary correction and then to make a secondary correction in which the armature core 1 is partially eliminated so that imbalance is corrected within a predetermined accuracy range. Further, it may be necessary to bind the resin or the like added to the imbalance portion by a tape so that the resin is prevented from coming off during rotation at high speed. Thus, the abovedescribed conventional method involves extremely low operability. On the other hand, the method according to the present invention only requires insertion of the metal material 8 or the like into the openings 7. Further, since the centroid position of the metal mateial 8 or the like is substantially constant and, moreover, the filling amount is easily controlled, it is possible to obtain a vector composition value which corresponds to an imbalance correction amount by a simple calculation. Accordingly, the operability is excellent, and it is possible to effect an imbalance correction with high accuracy.

Additionally, as regards the shape of the metal material 8 or the like to be inserted in the openings 7, it is possible to make use of various kinds of shape, such as a rivet shape, a screw shape, a shaft shape, a split pin shape, a bushing shape, a coiled spring shape or a polygonal shape. Moreover, the metal material 8 may be tapered at its end so that its insertability into the openings 7 is improved. Further, the metal material 8 may be formed into the shape of a hook for the purpose of improving the reliability of its fixing. On the other hand, as to the inserting method, it is possible to employ various kinds of method, such as press-fitting, caulking, riveting, screwing, shrink fitting or expansion fitting. As the material for the filler, it is possible to use various kinds of rubber and resin, or a liquid-state non-metallic material according to need in addition to a metal material, such as iron, copper, lead or aluminum.

It is to be noted that, although, in the above-described embodiment, the openings 7 have previously been provided and are filled with the metal material 8 or the like to thereby make an imbalance correction, the arrangement may be such that the whole of the inside of all the openings 7 have previously been filled with an easily workable member, such as a resin or lead, and imbalance is corrected by partially eliminating the filler. By this arrangement, it is possible to obtain the same effect as that offered by the abovedescribed embodiment. It is to be noted that, in such a case also, a technique similar to those shown in FIGS. 5 and 7 may, as a matter of course, be employed to increase the imbalance correction amount.

What we claim is:

1. An armature for a DC motor having an armature core with a shaft press-fitted therein, characterized in that two or more imbalance correcting openings are provided in said armature core in parallel to said shaft such as to be on a circumference which is concentric with said shaft, and members serving as weights respectively inserted in adjacent ones of said openings, the number of said adjacent openings being selected to be $(n-1)/2+1$ or less when the number n of said openings is odd and to be $n/2$ or less when said number n is even, whereby any imbalance is corrected.

2. An armature for a DC motor as defined in claim 1, characterized in that said openings have the same cross-sectional configuration.

3. An armature for a DC motor as defined in claim 1, characterized in that said openings are arranged to be equally spaced on a circumference which is concentric with said shaft.

4. An armature for a DC motor as defined in claim 1, characterized in that each of said openings has a circular cross-sectional configuration and is provided between the circumferential surface of said armature core and a shaft press-fitting bore of said armature core.

5. An armature for a DC motor as defined in claim 1, characterized in that, when the points of imbalance are concentrated on the center of said armature core, said members are inserted in the central portion of said openings.

6. An armature for a DC motor as defined in claim 1, characterized in that, when the points of imbalance are concentrated near both planar side surfaces of said armature core, said members are respectively inserted near the one planar surface of one opening and the other planar surface of another opening, and each member is arranged in the manner that the composite weight center of said members is arranged to be on the same plane containing each weight center of said members.

7. An armature for a DC motor as defined in claim 1, characterized in that at least one of said members is inserted to said opening after said member is eliminated partially.

8. An armature for a DC motor as defined in claim 1, characterized in that said armature core is provided with coils for said motor.

9. An armature for a DC motor comprising an armature core with a shaft press-fitted therein, said armature core being provided with balancing means for correcting any imbalance, said balancing means including at least three imbalance correcting openings provided in said armature core in parallel to said shaft so as to be on a circumference which is concentric with said shaft, and members serving as weights being respectively inserted in adjacent ones of the at least three openings so as to correct any imbalance, the number of the adjacent openings being selected to be $(n-1)/2+1$ or less when the number n of the imbalance correcting openings is an odd number and to be $n/2$ or less when the number n of the imbalance correcting openings is an even number.

10. An armature for a DC motor as defined in claim 9, wherein said armature core is provided with coils for said motor.

11. An armature for a DC motor as defined in claim 9, wherein the number n of the imbalance correcting openings is an odd number, and the imbalance correction amount to be inserted in the at least three adjacent imbalance correcting openings is selected to be:

$$\frac{Ml(1 + 2\cos\alpha)\cdot\cos\frac{\alpha}{4}}{\cos\left(\theta - \frac{\alpha}{4}\right)}$$

where M is the weight of one inserting material, l is the distance between the center of said shaft and the center of said imbalance correcting openings, $\alpha$ is the angle formed by two lines connecting the center of said shaft and the centers of two adjacent openings, and $\theta$ is the angle formed by a line connecting the center of said shaft and the center of an imbalance correcting opening located in the middle of the adjacent imbalance correcting openings having the members serving as weights inserted therein and another line connecting the center of said shaft and a position of the force couple corresponding to the imbalance position of said armature core.

12. An armature for a DC motor as defined in claim 11, wherein said imbalance correcting openings have the same cross-sectional configuration.

13. An armature for a DC motor as defined in claim 11, wherein said imbalance correctng openings are arranged to be equally spaced on a circumference which is concentric with said shaft.

14. An armature for a DC motor as defined in claim 11, wherein each of said imbalance correcting openings has a circular cross-sectional configuration and is provided between the circumferential surface of said armature core and a shaft press-fitting bore of said armature core.

15. An armature for a DC motor as defined in claim 11, wherein said members are inserted in the central portion of said imbalance correcting openings when the points of imbalance are concentrated on the center of said armature core.

16. An armature for a DC motor as defined in claim 11, wherein, when points of imbalance are concentrated near both planar side surfaces of said armature core, said members are respectively inserted adjacent one planar surface of one imbalance correcting opening and the other planar surface of another imbalance correcting opening, and each member is arranged in such a manner that the composite weight center of said members is arranged to be on the same plane containing each weight center of said members.

17. An armature for a DC motor as defined in claim 11, wherein at least one of said members is inserted into the imbalance correcting opening after said member is partially eliminated.

18. An armature for a DC motor according to claim 9, wherein the number n of imbalance correcting openings is an even number and the imbalance correction amount to be inserted into the imbalance correcting openings is selected to be:

$$\frac{2Ml\cos\left(\frac{\alpha}{2}\right)}{\cos\left(\frac{\alpha}{2} - \theta\right)}$$

where M is the weight of one inserting material, M is the distance between the center of the shaft and the center of the imbalance correcting opening, A is the angle formed by two lines connecting the center of the shaft and the centers of two adjacent openings, and R is the angle formed by a line connecting the center of the shaft and the center of an imbalance correcting opening located in the middle of the adjacent imbalance correcting openings having the members serving as weights inserted therein and another line connecting the center of said shaft and the position of the force couple corresponding to the imbalance position of said armature core.

19. An armature for a DC motor as defined in claim 18, wherein the imbalance correcting openings have the same cross-sectional configuration.

20. An armature for a DC motor as defined in claim 18, wherein the imbalance correcting openings are arranged to be equally spaced on a circumference which is concentric with said shaft.

21. An armature for a DC motor as defined in claim 18, wherein each of the imbalance correcting openings has a circular cross-sectional configuration and is provided between the circumferential surface of said armature core and a shaft press-fitting bore of said armature core.

22. An armature for a DC motor as defined in claim 18, wherein said members are inserted in the central portion of the imbalance correcting openings when the points of the imbalance are concentrated on the center of said armature core.

23. An armature for a DC motor as defined in claim 18, wherein, when points of imbalance are concentrated near both planar side surfaces of said armature core, said members are respectively inserted adjacent one planar surface of one imbalance correcting opening and the other planar surface of another imbalance correcting opening, and each member is arranged in such a manner that the composite weight center of said members is arranged to be on the same plane containing each weight center of said members.

24. An armature for a DC motor as defined in claim 18, wherein at least one of said members is inserted into the imbalance correcting opening after said member is partially eliminated.

* * * * *